(12) United States Patent
Ezumi et al.

(10) Patent No.: US 6,783,055 B2
(45) Date of Patent: Aug. 31, 2004

(54) FRICTION STIR WELDING METHOD AND ROTARY TOOL

(75) Inventors: Masakuni Ezumi, Yamaguchi (JP); Kazushige Fukuyori, Yamaguchi (JP); Hisanori Okamura, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/060,373

(22) Filed: Feb. 1, 2002

(65) Prior Publication Data

US 2003/0019913 A1 Jan. 30, 2003

(30) Foreign Application Priority Data

Jul. 24, 2001 (JP) ........................................ 2001-223080

(51) Int. Cl.⁷ ........................ B23K 31/02; B23K 20/12; B23K 37/00
(52) U.S. Cl. ..................................... 228/112.1; 228/2.1
(58) Field of Search .............................. 228/112.1, 2.1

(56) References Cited

U.S. PATENT DOCUMENTS

| | | | | |
|---|---|---|---|---|
| 5,794,835 A | * | 8/1998 | Colligan et al. | ............. 228/2.1 |
| 5,813,592 A | * | 9/1998 | Midling et al. | .......... 228/112.1 |
| 6,045,027 A | * | 4/2000 | Rosen et al. | ............. 228/112.1 |
| 6,138,895 A | * | 10/2000 | Oelgoetz et al. | ......... 228/112.1 |
| 6,206,268 B1 | * | 3/2001 | Mahoney | ................. 228/112.1 |
| 6,238,121 B1 | * | 5/2001 | Roser | ........................... 403/13 |
| 6,264,088 B1 | * | 7/2001 | Larsson | ....................... 228/2.1 |
| 6,557,746 B2 | * | 5/2003 | Ezumi et al. | ............. 228/112.1 |
| 2001/0004989 A1 | * | 6/2001 | Ezumi et al. | ................. 228/2.1 |
| 2002/0011510 A1 | * | 1/2002 | Enomoto | ................. 228/112.1 |
| 2002/0014516 A1 | * | 2/2002 | Nelson et al. | ........... 228/112.1 |
| 2002/0023941 A1 | * | 2/2002 | Ezumi et al. | ............. 228/112.1 |
| 2002/0092885 A1 | * | 7/2002 | Ezumi et al. | ................. 228/2.1 |

FOREIGN PATENT DOCUMENTS

| | | | |
|---|---|---|---|
| JP | P2002-96183 A | * | 4/2002 |
| JP | P2002-263863 A | * | 9/2002 |
| WO | WO 99/52669 | * | 10/1999 |

* cited by examiner

Primary Examiner—L. Edmondson
(74) Attorney, Agent, or Firm—Antonelli, Terry, Stout & Kraus, LLP (57) ABSTRACT

A rotary tool (200) having on the end surface of a large-diameter portion (210) facing a small-diameter portion (220) grooves (213) formed in arc-like shapes, and performing friction stir weld by inserting the end surface of the large-diameter portion (210) and the small-diameter portion to members and rotating the tool (200). By the rotation, the metal of the members moves along the grooves (213) to the center axis direction of the rotary tool (200). The arc-shaped grooves (213) are formed to curve toward the direction of rotation. Since the metal material of the members is moved toward the center, a good weld is realized even when only one of the members to be welded has a projection, or when a large gap is formed therebetween.

25 Claims, 10 Drawing Sheets

Fig. 1

200: ROTARY TOOL

210: LARGE-DIAMETER PORTION

220: SMALL-DIAMETER PORTION

213: GROOVE

FRICTION STIR WELDING METHOD AND ROTARY TOOL

FIELD OF THE INVENTION

The present invention relates to a friction stir welding method that is particularly preferable for joining aluminum alloy members to form transportation devices such as railway cars, industrial equipment, science-related equipment, electric appliances, and so on.

Friction stir welding is a method performed by inserting a rotating shaft (called a rotary tool) to the joint portion between members to be welded and moving the rotary tool along the joint line, thereby heating, softening, plasticizing and solid-phase welding the joint portion. The rotary tool comprises a large-diameter portion and a small-diameter portion. During welding, the small-diameter portion is inserted to the member(s) to be welded, and the end surface of the large-diameter portion comes into contact with the member(s). A screw thread is formed to the small-diameter portion. The end surface of the large-diameter portion facing the small-diameter portion is sloped and concaved. The central axis of the rotary tool is tilted in the direction of movement of the rotary tool. That is, the axis of the tool is tilted rearward to the direction of movement thereof. In another example, a bobbin-type rotary tool is used to friction stir weld a member placed between the two large-diameter portions of the bobbin-type tool.

According to another example, projections protruding to the side from which the rotary tool is inserted are formed to the two members to be welded, and friction stir welding is performed by inserting the small-diameter portion of the rotary tool to the abutted portion and inserting the large-diameter portion of the rotary tool to the projections. The metal material constituting the projections is used to fill the gap formed between the two abutted members. The projection can be formed only to one of the two members to be welded. Such method is used to weld extruded members, the friction stir welding being performed to the portion where the extruded direction of one member is orthogonal to that of the other member.

The above mentioned prior art methods are disclosed in the publications of Japanese Patent No. 3070735 (U.S. Pat. No. 6,237,829), Japanese Patent No. 2712838 (U.S. Pat. No. 5,460,317), Published Japanese Translation of PCT Patent Application No. 508073/97 (EP 0752926B1), and Japanese Patent No. 3070735 (U.S. Pat. No. 6,237,829).

When performing the friction stir welding method, if only one of the two members being abutted for welding has the projection as mentioned above, it is difficult to obtain a good weld as compared to the case where both members are provided with the projection.

If a gap exists at the abutted portion, the metal constituting the projection(s) is used as the material to fill the gap formed thereto. However, if only one of the two members being abutted has the projection, it is difficult to obtain a good weld because of the gap existing at the abutted portion. Even if both abutted members are provided with the projection, it becomes difficult to obtain a satisfactory weld as the gap increases.

Moreover, since the central axis of the rotary tool must be tilted in the direction of movement of the rotary tool, if the joint line is curved, it is necessary to control the tilt of the axis to a predetermined angle in the direction of movement of the tool, which involves complicated operation. Especially when the radius of curvature of the joint is small, the tilt control becomes even more difficult.

SUMMARY OF THE INVENTION

The object of the present invention is to provide a good friction stir weld in cases where only one of the members being abutted for welding has a projection, where a large gap exists at the abutted portion, or where the joint line is curved.

The object of the present invention is achieved by a friction stir welding method comprising abutting a pair of members, wherein only one of the members has a projection formed at the abutted portion thereof, the other member being abutted to the portion excluding the projection of the first member, using a rotary tool having protruding and/or recessed portions formed to the end surface of a large-diameter portion that faces a small-diameter portion, the small-diameter portion being inserted in the abutted portion and the end surface of the large-diameter portion being inserted only in the projection during the friction stir welding.

The object of the present invention is achieved by utilizing a rotary tool having on the end surface of the large-diameter portion facing the small-diameter portion a groove that extends from the outer periphery of the large-diameter portion and reaches the small-diameter portion side, and while inserting the end surface of the large-diameter portion and the small-diameter portion to the members, rotating the rotary tool so that the metal material of the member(s) move along said groove toward the axial center of the rotary tool.

The object of the present invention is achieved by utilizing a rotary tool comprising a large-diameter portion and a small-diameter portion, and performing the friction stir welding method while the small-diameter portion and the end surface of the large-diameter portion are inserted to the members. The large-diameter portion comprises a first large-diameter portion formed as a separate member from the small-diameter portion, and a second large-diameter portion that is formed as the same member as the small-diameter portion, wherein the small-diameter portion, the first large-diameter portion and the second large-diameter portion are arranged in this order along the central axis of the rotary tool, the first large-diameter portion being screwed onto the axial portion between the second large-diameter portion and the small-diameter portion, the end surface of the first large-diameter portion being in contact with the end surface of the second large-diameter portion, the rotary tool being rotated in the same direction as the screw thread used to screw the first large-diameter portion to the axial portion.

DETAILED DESCRIPTION OF PREFERRED EMBODIMENTS

Figure 1:
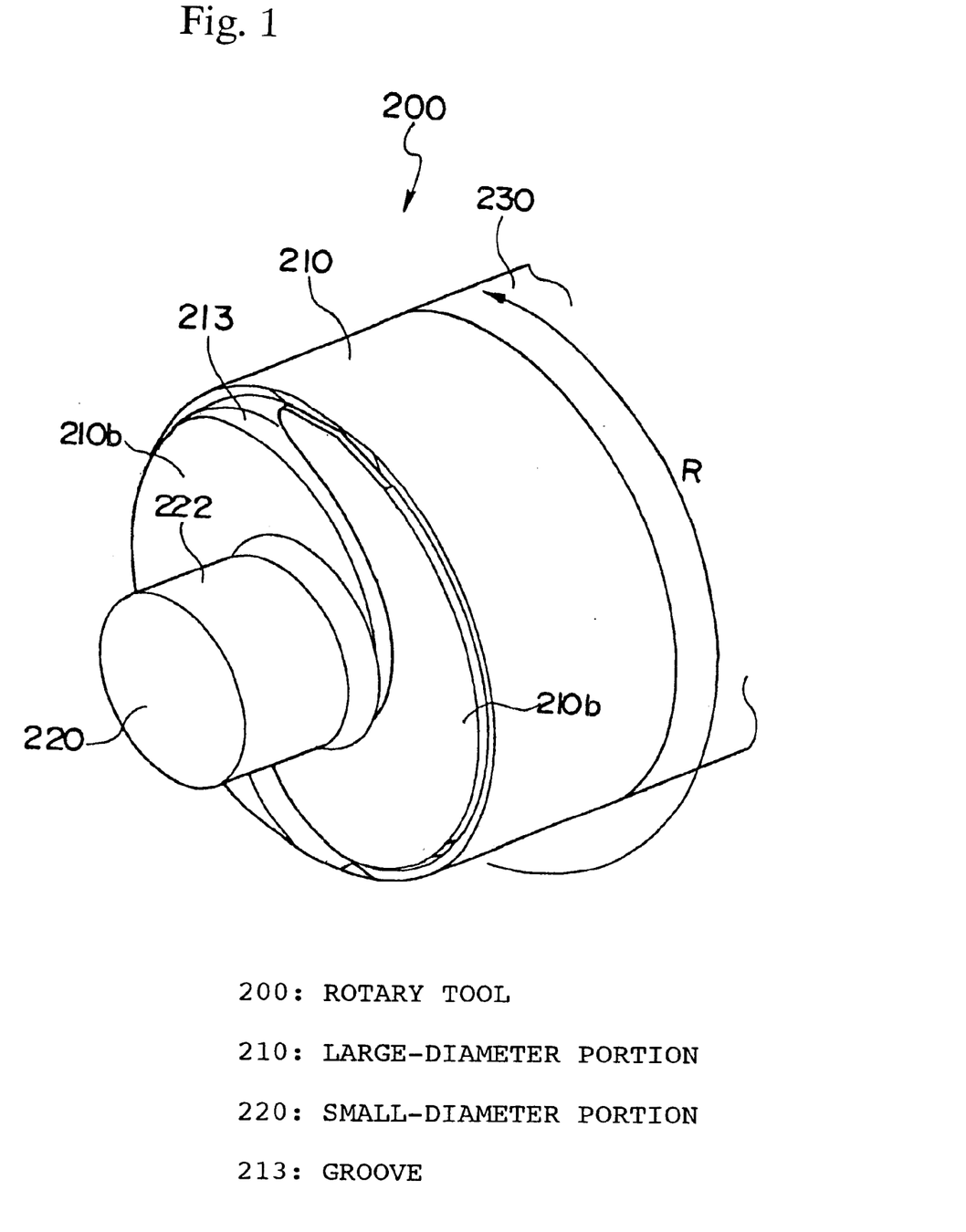
FIG. 1 is a perspective view showing the main portion of the rotary tool according to one embodiment of the present invention.
Figure 2:
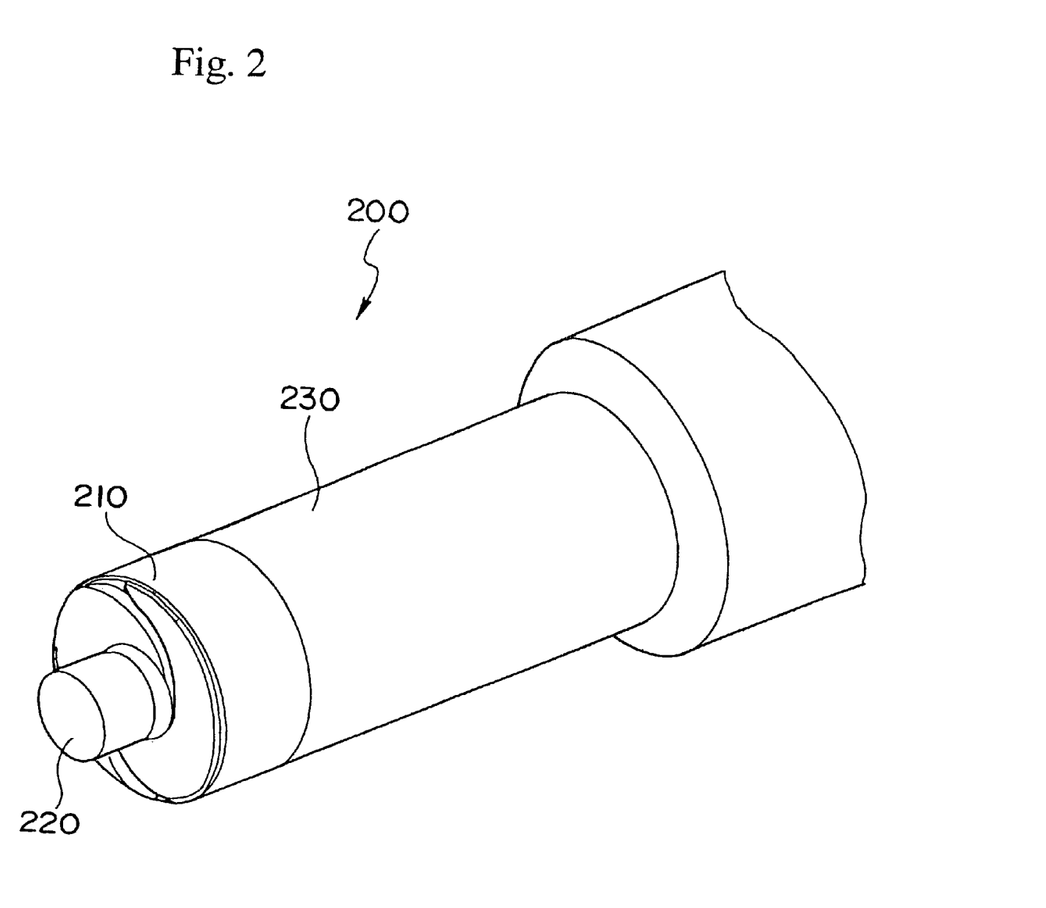
FIG. 2 is a perspective view showing the whole rotary tool of FIG. 1.
Figure 3:
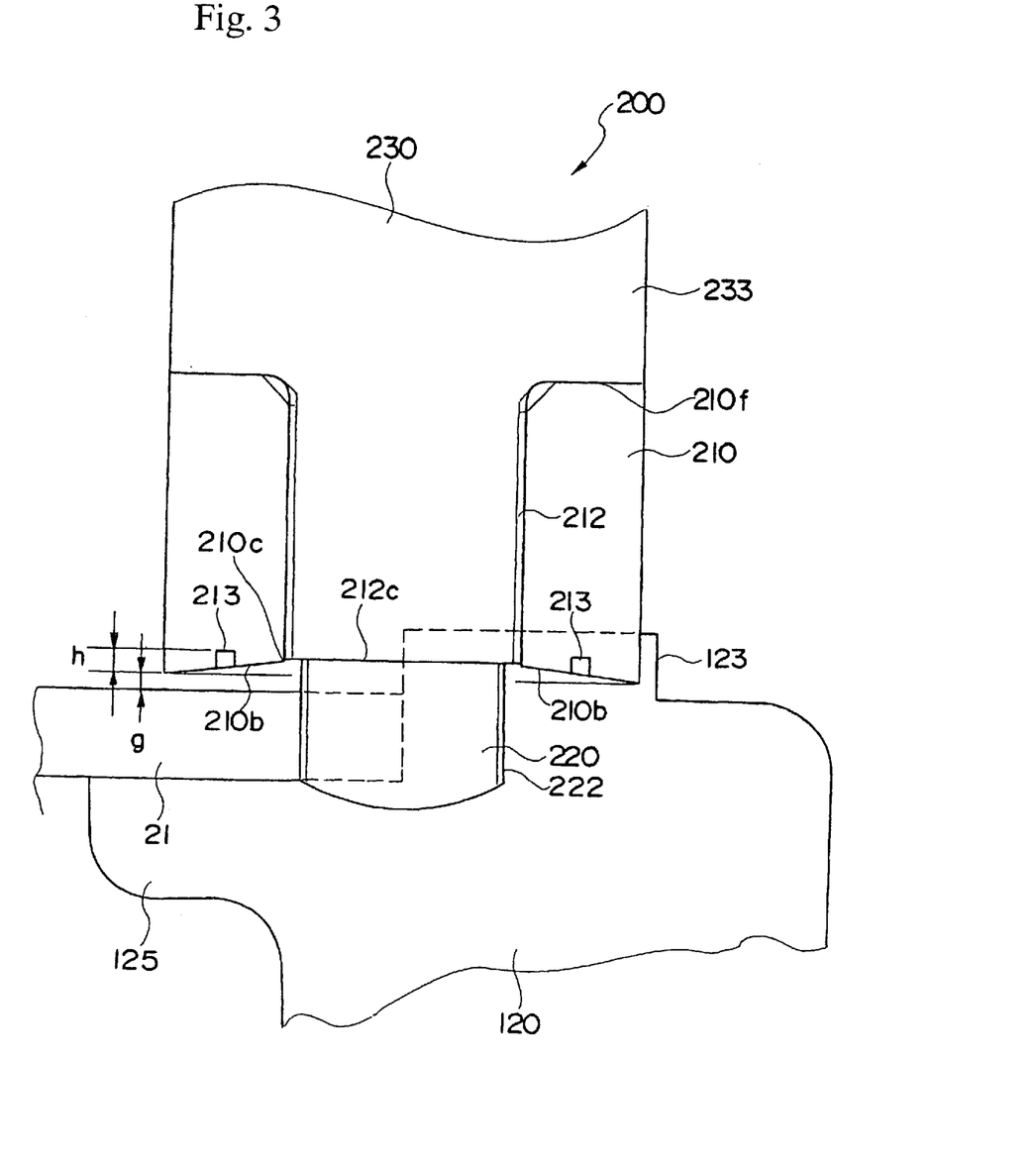
FIG. 3 is a vertical cross-sectional view showing how the abutted portion is welded using the rotary tool of FIG. 1.

The preferred embodiment of the present invention will now be explained with reference to FIGS. 1 through 9. FIG. 3 is a cross-sectional view taken at line III—III of FIG. 4, and corresponds to the VII—VII cross section of FIG. 6.

Figure 9:
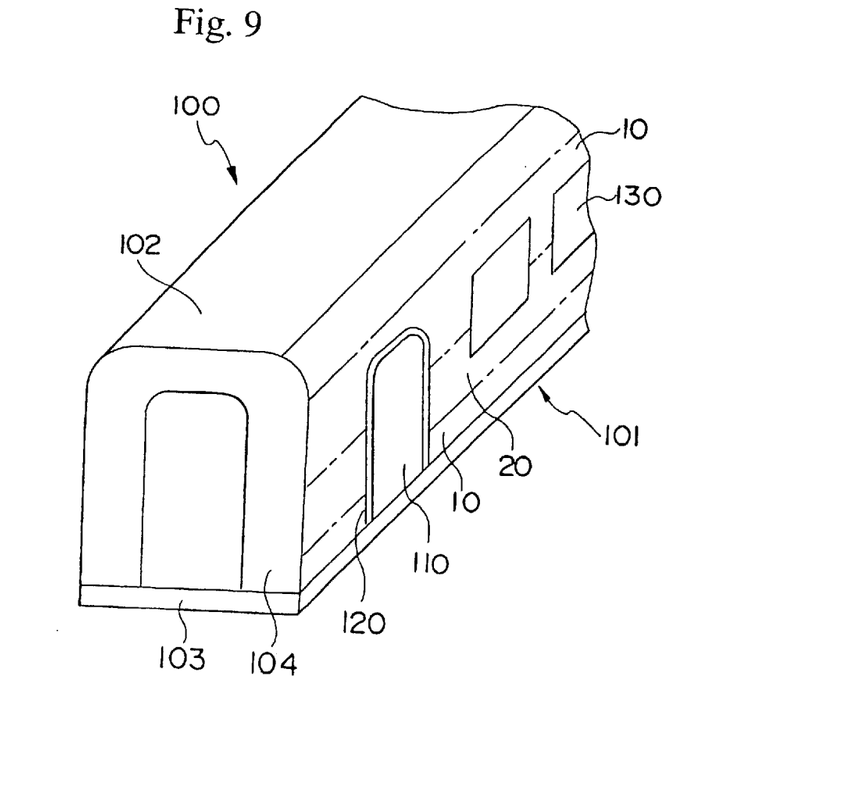
FIG. 9 is a perspective view of the railway car body.

A car body 100 of a railway car comprises side structures 101 that constitute the side walls of the car, a roof structure 102 that constitutes the roof thereof, an underframe 103 that constitutes the floor thereof, and end structures 104 that constitute the longitudinal ends thereof. The side structures 101, the roof structure 102, and the underframe 104 are each formed by welding plural extruded members 10, 20. The longitudinal direction (extruded direction) of each extruded member 10, 20 is positioned along the longitudinal direction of the car body 100. Each extruded member 10, 20 is a hollow member made of aluminum alloy.

Figure 6:
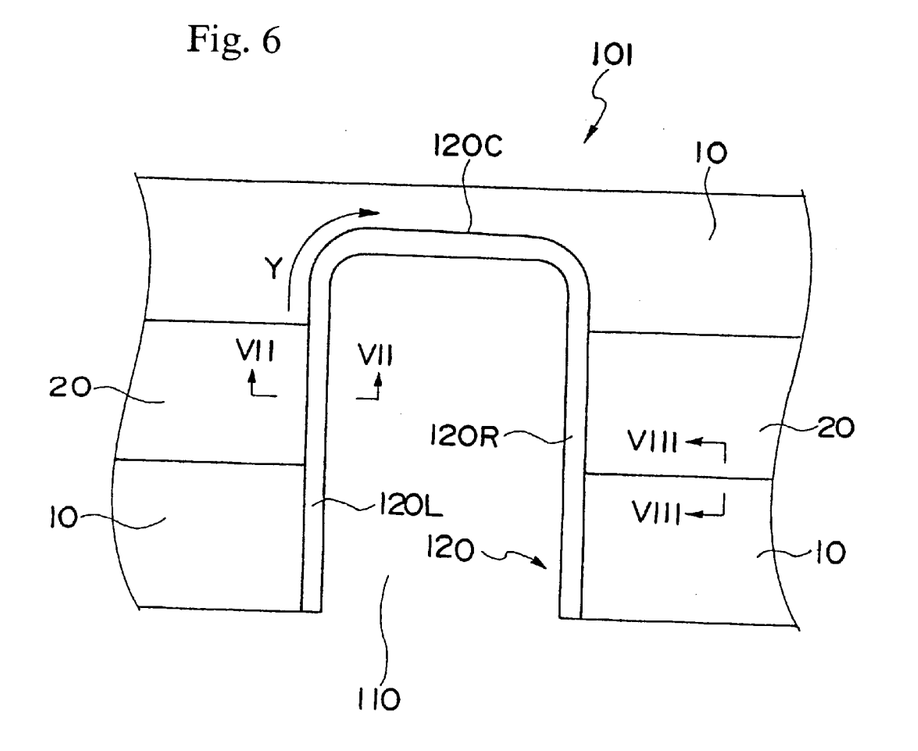
FIG. 6 is a front view showing the side structure of one embodiment of the present invention.

Each side structure 101 has plural windows 130, and an entrance 110 through which passengers enter and exit the railway car. A rim member 120 is welded onto the rim of the entrance 110. The rim member 120 is a thick member having high strength. The rim member 120 is an extruded member made of aluminum alloy, and is bent into a U-shape to fit to the left, right and upper edges of the entrance 110.

The direction of extrusion of the extruded members 10, 20 constituting the side structure 101 is the longitudinal direction of the car body or longitudinal direction of the side structure. Since the rim member 120 is also extruded, the direction of extrusion of the rim member 120 is orthogonal to the direction of extrusion of the members 10 and 20 at the left and right edges of the entrance 110. The extruded members 10 and 20 are hollow members.

Figure 8:
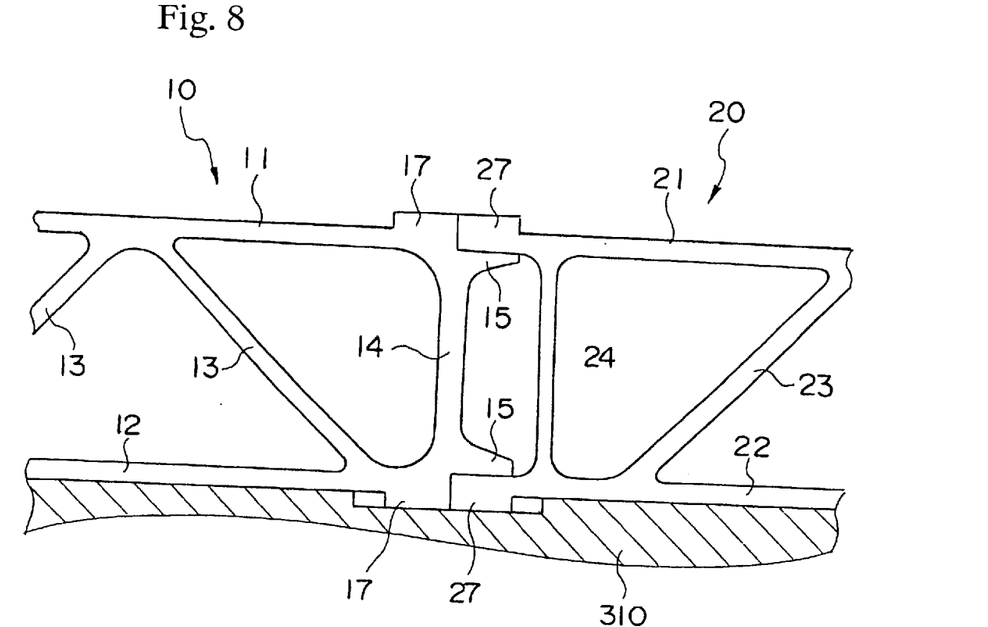
FIG. 8 is a vertical cross-sectional view taken at line VIII—VIII of FIG. 6.

Each hollow member 10 (20) consists of substantially parallel two face plates 11 (21) and 12 (22), and plural connecting plates 13 (23) and 14 (24) that connect the two face plates.

The connecting plate 14 (24) positioned at the width-direction-end of the hollow member 10 (20) is orthogonal to the face plates 11 and 12 (21 and 22). At the outer surface of the connection between the connecting plate 14 and the face plate 11 (12) is formed a recessed portion on which the face plate 21 (22) of the hollow member 20 overlaps. At the end of the face plates 11 and 12 there are protruded blocks 15 that support the face plates 21 and 22. The protruded blocks 15 extend from the connecting plate 14. The protruded blocks 15 are connected to the recessed portions. The ends of the face plates 21 and 22 of the hollow member 20 are superposed on the recessed portions and the protruded blocks 15 of the hollow member 10.

At the end of each face plate 11 and 12 (21 and 22) there is formed a projection 17 (27) that protrudes toward the outer side (the outer direction of thickness) of the hollow members 10 and 20. The end surface of the face plates 11, 21 and the projection 17 (in other words, the edge of the recessed portion close to the face plates 11 and 12) is near the center of thickness of the connecting plate 14. The end surface of the face plate 11 (12) and projection 17 of the hollow member 10 is abutted against the end surface of the face plate 21 (22) and projection 27 of the hollow member 20.

The outer surface of the face plate 11(12) is leveled with the outer surface of the face plate 21 (22), and the protruding height of the projections 17 and 27 are the same. The width of the two projections 17 and 27 are the same. The width of the two projections is greater than the diameter of the large-diameter portion 210 of the rotary tool 200.

First, the welding between the member 10 and member 20 is explained. Upon welding the two hollow members 10 and 20, the members are mounted on a base 310 and fixed thereto. The rotary tool 200 has a small-diameter portion 220 formed at the tip of a large-diameter portion 210. The small-diameter portion 220 is provided with a screw thread. Upon welding, the rotary tool 200 is inserted to the abutted portion of the members. The lower end of the large-diameter portion 210 is positioned within the projections 17 and 27 that are positioned above the face plates 11 and 21. The small-diameter portion 220 is inserted to the abutted portion between the face plates 11 and 21. The lower end of the small-diameter portion 220 is somewhat inserted in the protruded block 15. The rotary tool 200 is rotated and moved along the joint line of the abutted portion. The central axis of the rotary tool is tilted toward the direction of movement. The small-diameter portion 220 precedes the large-diameter portion 210. The metal constituting the projections 17 and 27 is utilized as material for filling the gap formed at the abutted portion. There is no gap shown in the abutted portion of FIG. 8. The rotary tool 200 used for the friction stir weld can either be the rotary tool 200 explained later in detail or can be any rotary tool used conventionally.

After completing the friction stir welding of the upper surface of FIG. 8, the upper and lower sides of the hollow members 10 and 20 are reversed, and friction stir welding of the opposite side is performed in a similar manner.

After welding all the hollow members 10, 20 that constitute the side structure 101, the unnecessary areas around the windows 130 and entrance 110 are cut off, with the inner side of the car body facing upward. According to this cutting process, the end region around the windows 130 or the opening of the entrance 110 of the face plate 21 (11) facing the exterior of the car body is protruded toward the opening side than the end portion of the face plate 22 (12) facing the interior or the end portion of the connecting plates 23, 24 (13, 14).

Figure 7:
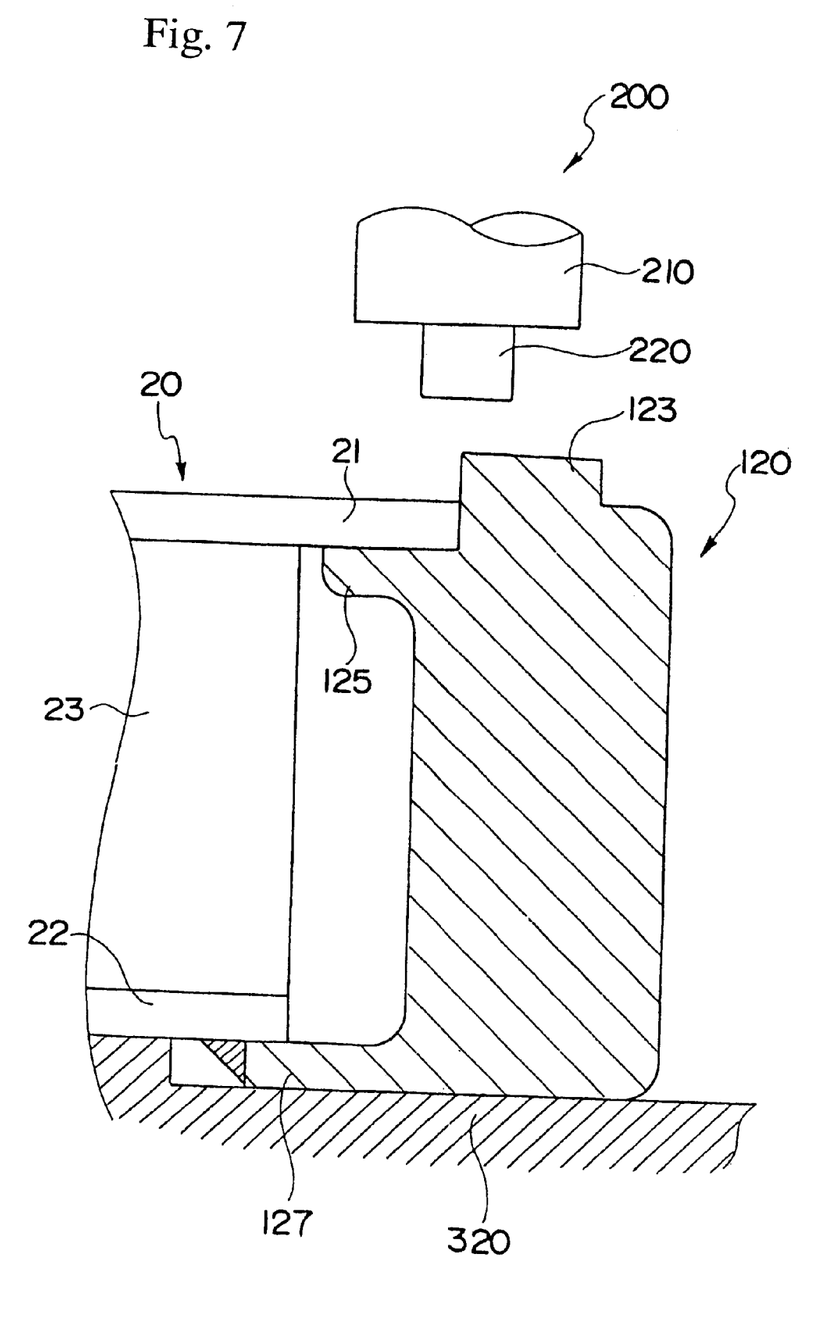
FIG. 7 is a cross-sectional view taken at line VII—VII of FIG. 6.

Next, a rim member 120 is friction stir welded onto the side structure 101 formed as mentioned above. The rim member 120 is a member formed by bending an extruded member into a U-shape. The rim member 120 comprises a block 121 that terminates the ends of the hollow members 10 and 20, a projection 123 that protrudes outward from the outer surface of the face plate 21 (11) facing the exterior of the car body, a protruded block 125 that is superposed to the inner surface of the face plate 21 (11), and a protruded block 127 that is superposed to the outer surface 22 (12) of the face plate facing the interior of the car body. The end surface of the block 121 excluding the projection 123 is positioned on the same plane as the outer surface of the face plate 21 (11). The protruded block 125 facing the exterior is recessed from the exterior side of the car body. The end of the face plate 21 (11) is abutted against the rim member 120. The protruded block 127 facing the interior of the car body overlaps the outer side of the face plate 22 (12) facing the interior of the car body, and fillet welding is performed thereto. The fillet welding is performed at an appropriate timing either before or after the friction stir welding.

Since the end of the face plates 21 and 11 abutted against the rim member 120 is at the end of the direction of extrusion, there are no projections 17 and 27 formed to the face plates 11 and 21. Since the hollow member 10 coming into contact with a center block 120C of the U-shaped rim member 120 has its width-direction-end cut off, there are no projections 17 and 27 on the hollow member 10.

FIG. 7 shows the state where friction stir welding is performed to the members, but no gap is shown formed at the abutted portion. The rim member 120 and the side structure 110 are fixed on the base 320.

The abutted portion between the face plate 21 (11) and the rim member 120 is friction stir welded from above. The small-diameter portion 220 of the rotary tool 200 is inserted to the abutted portion. The tip of the small-diameter portion is inserted to reach the proximity of the surface of the protruded block 125 facing the exterior side of the car body. A part of the large-diameter portion 210 is inserted to the projection 123. The insertion is performed so that a gap g is formed between the lower end of the large-diameter portion 210 and the upper surface of the face plate 21 (11). Since the rotary tool 200 is inserted so that the large-diameter portion 210 is tilted rearward against the direction of movement, the gap g is formed between the lowermost end of the tilted large-diameter portion 210 and the upper surface of the face plate 21 (11).

After inserting the rotary tool 200 to the joint to be welded, the rotary tool 200 is rotated and moved at the same time along the joint line. The direction of rotation is shown by R, and the direction of movement is shown by Y. The axial center of the rotary tool 200 is at the center of the abutted portion between the rim member 120 and the face plate 21 (11). An optical sensor is used to detect the abutted portion, and the rotary tool is guided accordingly.

The rotary tool 200 is inserted to the abutted portion at the lower end of the left side 120L of the rim member 120, and starts moving therefrom. The rotary tool 200 sequentially moves through the left side 120L, the center edge 120C, the right side 120R, and terminates weld at the lower end of the right side 120R.

Figure 4:
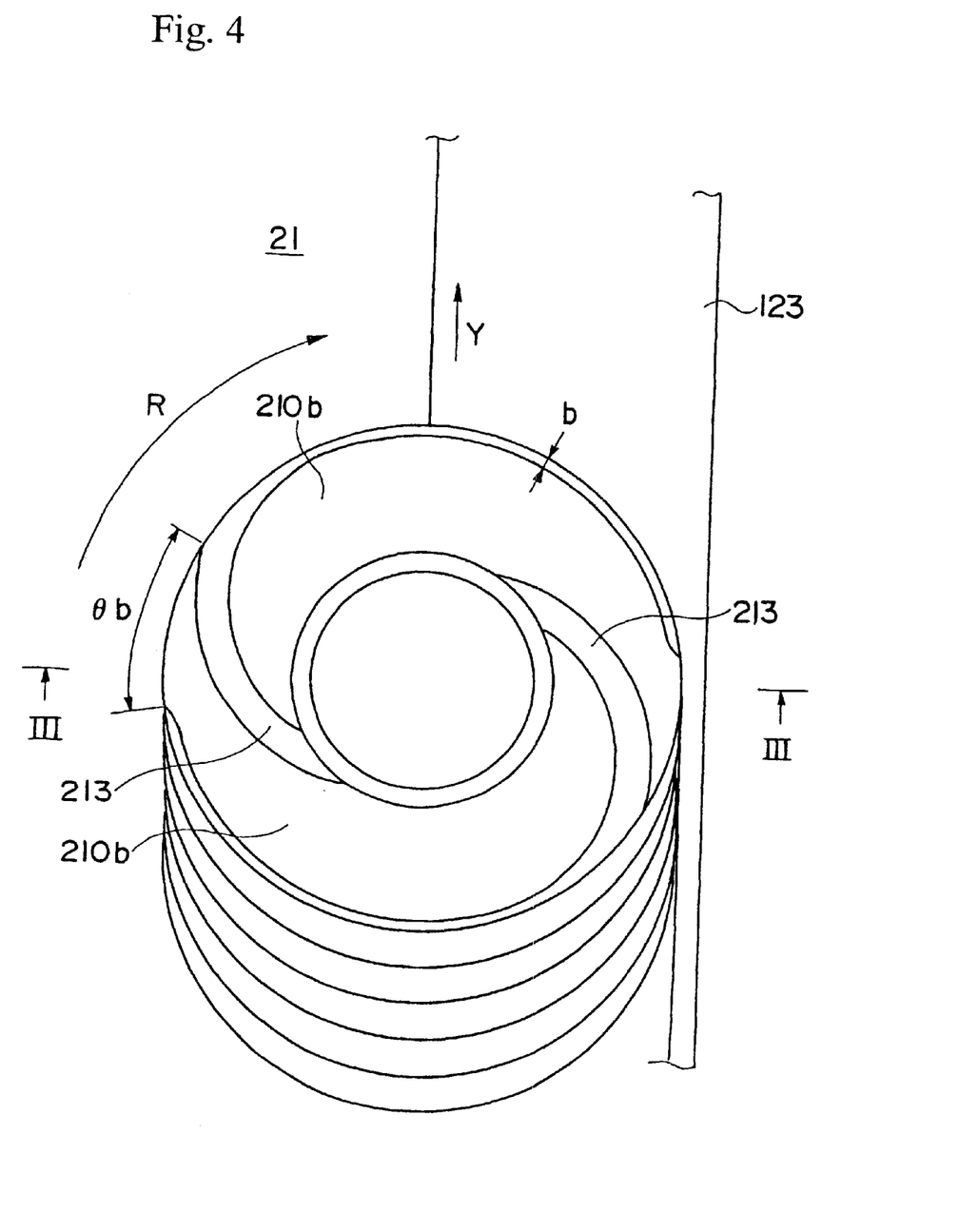
FIG. 4 is a plan view of FIG. 3.

The structure of the rotary tool 200 is explained with reference to FIGS. 1 through 4. Since FIG. 4 is a plan view of FIG. 3, the grooves 213 and the like at the end surface 210b of the large-diameter portion 210 facing the small-diameter portion 220 should not be drawn in FIG. 4, but for better understanding of the structure, the grooves 213 are shown in FIG. 4. The circular arc lines in FIG. 4 shows the trajectory (path) of the rotary tool 200 moving in the Y direction.

The rotary tool 200 comprises a screw thread 222 formed to the small-diameter portion 220 and a screw thread 212 formed to the large-diameter portion 210 side. The diameter of the screw thread 212 is greater than the diameter of the screw thread 222. The large-diameter portion 210 is screwed onto the screw thread 212. The screw thread 222 on the small-diameter portion 220 is a left-hand screw, and the screw thread 212 of the large-diameter portion 210 is a right-hand screw. The rotary tool 200 is rotated in the right-hand direction. The central edge 210c of the end surface 210b of the large-diameter portion 210 facing the small-diameter portion 220 is at the end 212c of the screw thread 212. The other end 210f of the large-diameter portion 210 (the end surface opposite from the small-diameter portion 220) contacts the end surface of the large-diameter portion 233 of the axial member 230 having the screw thread 212. Since the screw thread 212 of the large-diameter portion 210 is a right-hand screw, when the rotary tool 200 rotates in the right-hand direction, the force of the large-diameter portion 210 coming into contact with the projection 123 presses the large-diameter portion 210 to the large-diameter portion 233 of the axial member 230. This fixes the large-diameter portion 210 to the axial member 230.

The end surface 210b of the large-diameter portion 210 facing the small-diameter portion 220 is concaved gradually toward the center as it approximates the center side (axial center). The concaved end surface 210b is conic. The conic surface 210b has two arc-shaped grooves 213. The grooves 213 are for moving the metal constituting the projection 123 to the side of the face plate 21 (11), and is formed as explained below.

When viewed from the side of the axial end of the rotary tool 200, the grooves 213 are arc-shaped. The direction of the arc of each groove 213 is the same as the direction of rotation R of the rotary tool 200. In other words, the grooves 213 are each formed so that it advances toward the direction of rotation R as it approaches the outer periphery side (outer radial direction).

Each groove 213 is continuously formed from the outer periphery of the large-diameter portion 210 to the inner edge thereof (the axial center side), or in other words, to the screw thread 222. It can be said that each groove 213 is formed around the proximity of the small-diameter portion 220. The grooves 213 are created by cutting the member forming the large-diameter portion 210 from the axial direction. Therefore, the large-diameter portion 210 is formed separately from the axial member 230.

Further, since the large-diameter portion 210 is formed as a separate member from the axial member 230 (small-diameter portion 220), the screw thread 222 of the small-diameter portion 220 can be formed close to the screw thread 212. Therefore, the metal can be plasticized (stirred) even at the proximity of the axial side (210c) of the large-diameter portion 210. The corner 210c is in line with the end 212c of the screw thread 212, but the corner 210c can also be provided to protrude toward the small-diameter portion 220 from the end 212c of the screw thread 212, thereby approximating the screw thread 220 to the corner 210c and facilitate stirring.

The outer periphery of the grooves 213 is formed so that metal constituting the projection 123 can easily enter the grooves. In other words, the outer periphery edge of a groove 213 between the adjacent groove 213 is cut to form a notch with a width b as shown in FIG. 4. The depth of width b is substantially the same as the depth of the grooves 213. The range of the notch extends from a groove 213 to the proximity of the adjacent groove 213 in the direction of rotation R of the rotary tool 200. The rear of the groove 213 in the direction of rotation is not notched for range θb. The width of each groove is greater at the outer periphery side (at the side through which the metal material enters the groove) than the inner side.

The diameter of the large-diameter portion 210 is greater than that of the screw thread 212, and the diameter of the screw thread 212 is greater than that of the screw thread 222. The width of the groove 213 is approximately 1 mm, and the depth h of the groove 213 (the distance from the outer periphery of the large-diameter portion 210 (the portion of the outer periphery not having the notch b)) is approximately 1 mm. The width of each projection 17, 27 and 123 is greater than half the diameter of the large-diameter portion 210. A gap g exists between the upper surface of the face plate 21 (21) and the lowermost end of the large-diameter portion 210. The gap g is obtained when the rotary tool 200 is tilted. At this time, substantially half the lowermost end of the large-diameter portion 210 is inserted to the projection 213, and the lowermost end of the small-diameter portion 220 is inserted in the protruded block 125.

While the rotary tool 200 is inserted to the abutted portion, the tool 200 is rotated in the right-hand direction and moved along the joint, and the opening at the outer periphery side of the groove 213 positioned above the face plate 21 where no projection 123 exists moves toward the projection 123. By this movement, the metal constituting the projection 123 enters the groove 213, and moves toward the center axis direction (toward the screw thread 222). Then, when the metal moves to a position where projection 123 does not exist, the metal inside the groove 213 is released on top of the face plate 21. Thereby, a considerable amount of metal material is moved to the upper area of the face plate 21. Moreover, since the metal material moves toward the center area by the groove 213, the gap existing between the abutted members, if any, is filled with the mobilized metal material as a result. The entrance of the groove 213 formed to the outer periphery is provided with a notch b, and the width of the groove 213 is widened at the outer side, so metal can easily enter the groove 213 and can move along the groove 213. Since the groove 213 is formed in an arc shape that protrudes toward the direction of rotary advancement, more metal can be moved with less resistance.

Figure 5:
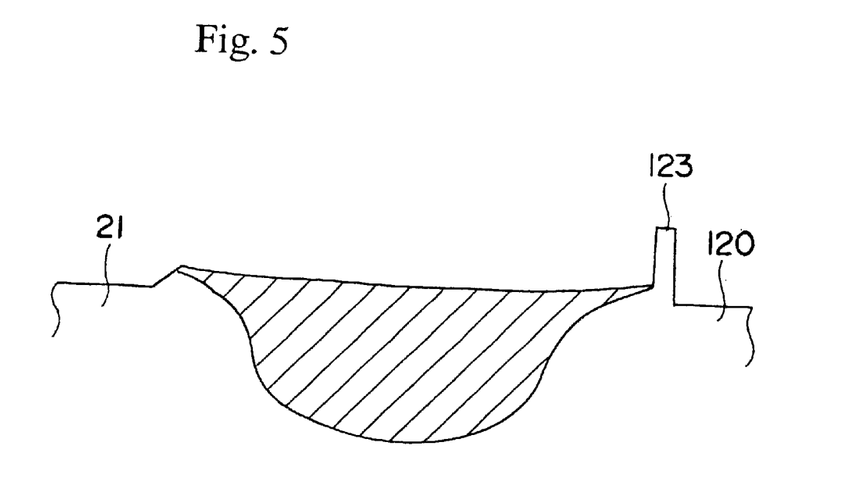
FIG. 5 is a vertical cross-sectional view after the weld.

As explained, a considerable amount of metal is moved above the face plate 21, and metal is filled to the gap formed at the joint, thereby realizing a good weld. FIG. 5 shows a frame format of the cross-sectional view after the weld. The hatching represents the stirred region.

Since the large-diameter portion 210 is formed separately from the small-diameter portion 220, it is easy to form grooves 213 thereto. Further, the screw thread 222 can also be created easily to the large-diameter portion. Furthermore, since the direction of the screw thread 212 of the large-diameter portion 210 and the direction of rotation R of the rotary tool 200 is the same, the large-diameter portion 210 can be fixed to the axial member 230. According to the present embodiment, other fixing means can be omitted. The means for fixing the large-diameter portion 210 by the direction of rotation of the rotary tool and the direction of the screw 212 can be applied regardless of whether grooves 213 exist or not.

This rotary tool 200 can also be used when projections are provided to the pair of members at the abutted region. For example, the tool can be used to weld the abutted portion between the projection 17 on the face plate 11 and the projection 27 on the face plate 21 shown in FIG. 8. In the case where projections are formed, a good weld is obtained even if the gap formed at the abutted portion is large. Upon welding, the lower end of the large-diameter portion 210 of the tool is positioned between the outer surface of the face plates 11 and 21 and the upper surface of the projections 17 and 27.

The shape of the groove(s) formed to the rotary tool is not limited to an arc, but can be radial, or can even be plural cylindrical projections. As long as protruding and/or recessed portions are formed on the end surface of the large-diameter portion, the groove (or protrusion) can be of any form.

Figure 10:
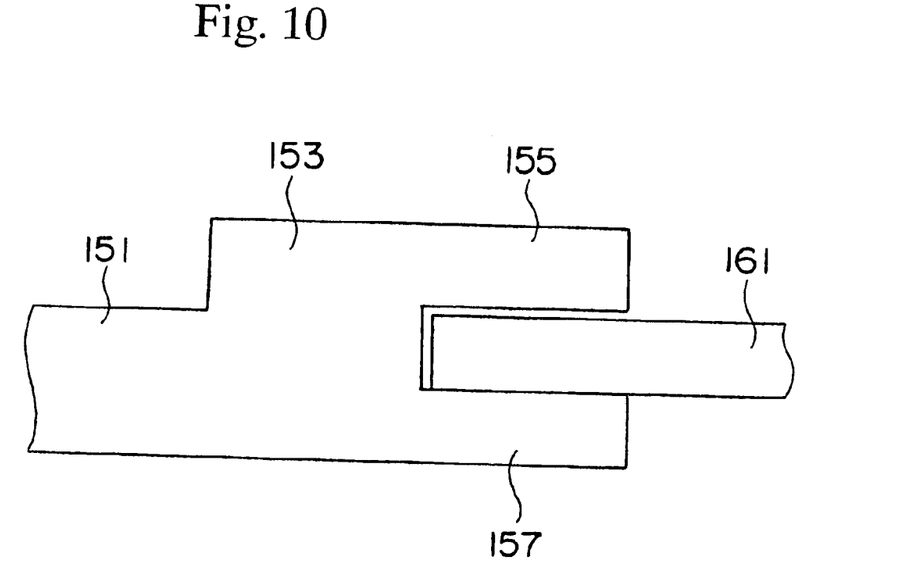
FIG. 10 is a vertical cross-sectional view showing the joint of another embodiment of the present invention.

The embodiment of FIG. 10 will now be explained. A projection 153 protrudes from the front surface side of the end of a plate 151. A protruded block 155 protrudes parallel to a plate 161 from the end of the projection 153. A protruded block 157 protrudes parallel to the protruded block 155 at the back surface side of the plate 151. A plate 161 is positioned to fit between the two protruded blocks 155 and 157, and is butted against the plate 151. Upon welding, the lower end of the large-diameter portion 210 of the rotary tool 200 is positioned to fit within the projection 153 and the protruded block 155.

Figure 11:
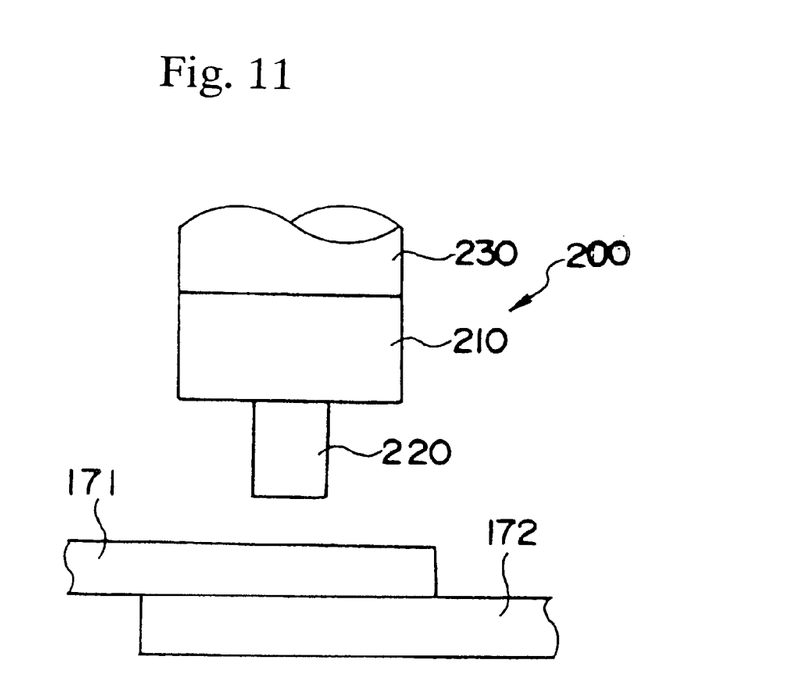
FIG. 11 is a vertical cross-sectional view the joint of yet another embodiment of the present invention.

The embodiment of FIG. 11 will now be explained. The rotary tool 200 as explained above can be applied to welding lap joints of two members 171 and 172. In such case, the tilt of the rotary tool 200 against the direction of movement can be set to zero (0). If the tilt angle is zero, even if the joint line is curved, it becomes unnecessary to control the tilt angle of the rotary tool 200 against each position on the curved joint, and therefore the welding can be performed with ease.

Setting the tilt angle of the rotary tool to zero is not limited to lap joints, and can be applied to butt joints as well. In case the tilt angle of the tool is set to zero upon welding butt joints, the gap existing between the members at the abutted portion should be zero or as small as possible.

Figure 12:
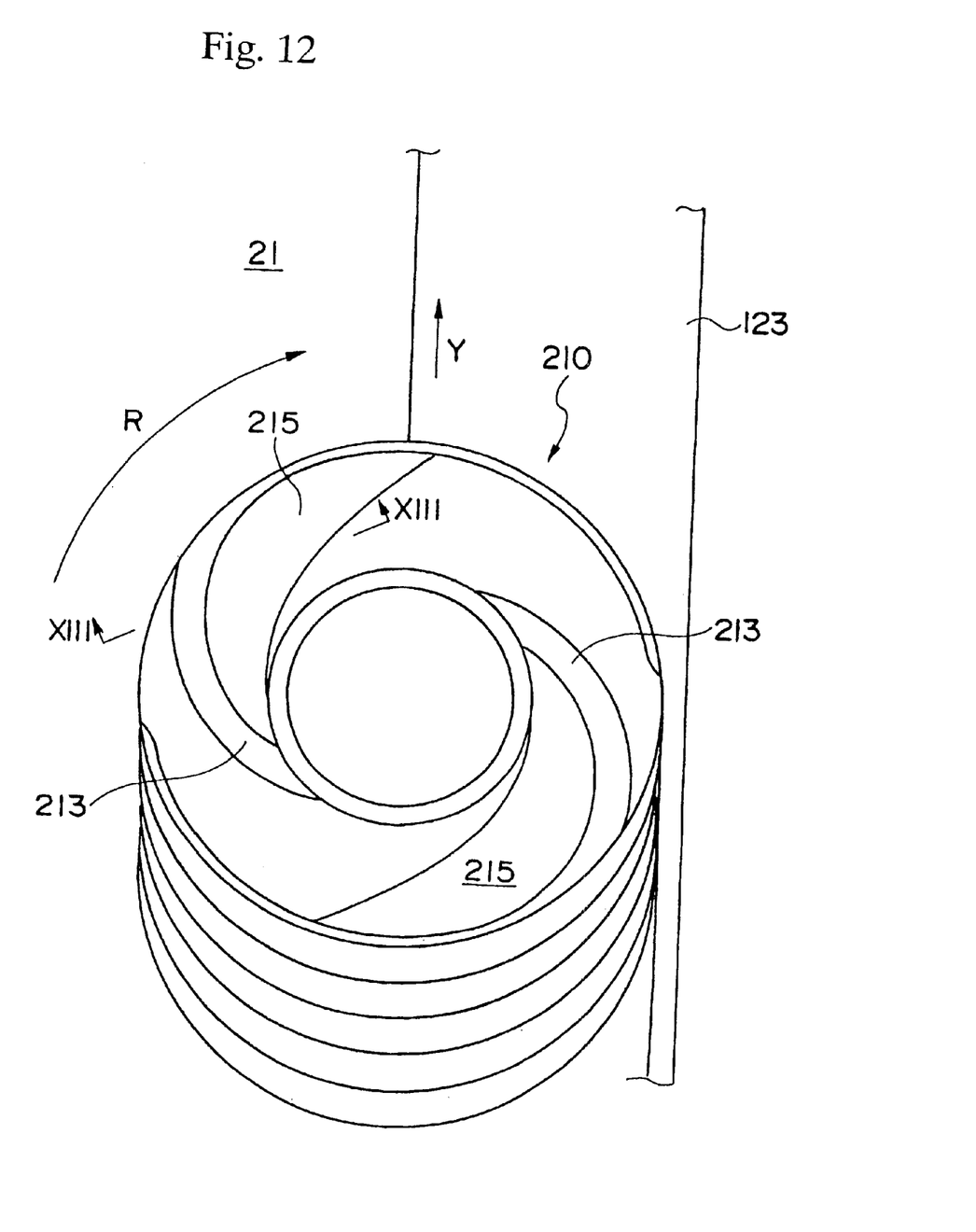
FIG. 12 is a plan view of the rotary tool according to another embodiment of the present invention.
Figure 13:
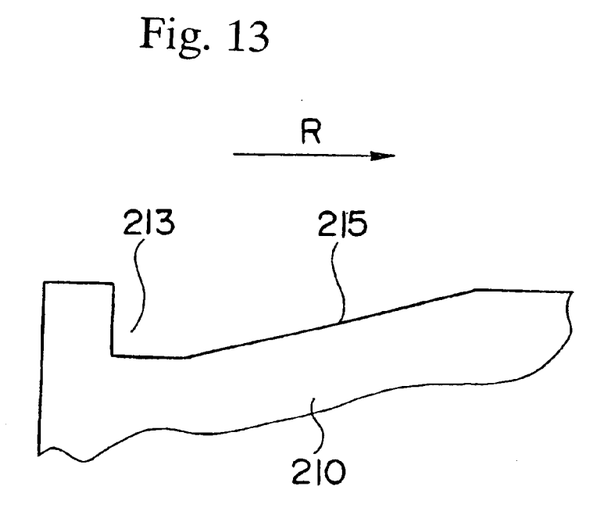
FIG. 13 is a cross-sectional view taken at line XIII—XIII of FIG. 12.

The embodiment shown in FIGS. 12 and 13 will now be explained. FIG. 12 is a view showing the rotary tool in a manner similar to FIG. 4. The rotary tool 200 in the present embodiment is formed so that the depth of groove 213 is gradually reduced toward the forward direction of rotation R. In other words, the forward area has a slope 215. According to this embodiment, the movement of metal into the groove 213 is considered to increase.

Figure 14:
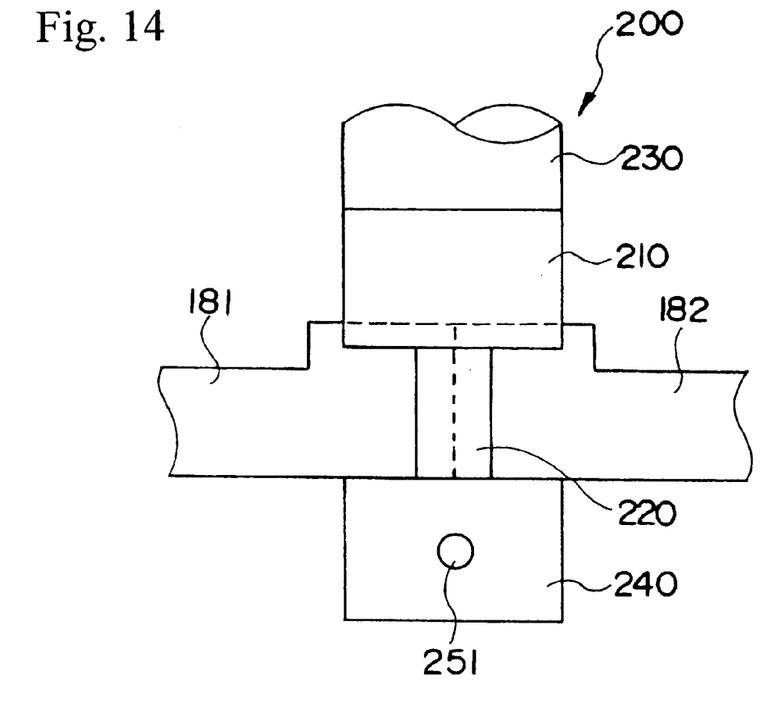
FIG. 14 is a vertical cross-sectional view showing the joint of yet another embodiment of the present invention.

The embodiment of FIG. 14 will now be explained. This rotary tool 200 is of a bobbin type, wherein two large-diameter portions 210 and 240 are formed to both ends of the small-diameter portion 220. The large-diameter portion 240 is mounted at the tip of the small-diameter portion 220. Friction stir welding is performed by inserting the butted portion of members 181 and 182 between the two large-diameter portions 210 and 240. The large-diameter portion 240 is fixed to the tip of the small-diameter portion 220 with a pin 251. The surface of the large-diameter portion 240 facing the small-diameter portion 220 is concaved. This concaved surface is provided with grooves similar to those of the preceding embodiments. The direction of the grooves 213 is also similar to preceding embodiments. The other large-diameter portion 210 can also be fixed using a pin.

The technical scope of the present invention is not restricted by the terms used in the claims or in the summary of the present invention, but is extended to the range in which a person skilled in the art could easily substitute based on the present disclosure.

According to the present invention, a satisfactory friction stir weld is realized even when only one of the two members forming the butt joint is provided with a projection, or when the gap formed at the butt joint is large, or when the joint line is curved.

We claim:

1. A friction stir welding method comprising:
    abutting a pair of members, only one of said members having a projection formed to the abutted portion, the other member being abutted to the portion excluding said projection of said first member, the projection extending on the thickness direction of said only one of said member; and
    friction stir welding said members using a rotary tool having protruding and/or recessed portions formed to the end surface of a large-diameter portion facing a small-diameter portion, with said projection facing toward the rotary tool during said friction stir welding, wherein upon welding, said small-diameter portion is inserted into said abutted portion and the end surface of said large-diameter portion is inserted only into said projection.

2. A friction stir welding method according to claim 1, wherein
said rotary tool having as said protruding and/or recessed portions an arc-shaped groove that extends from the outer periphery of said large-diameter portion and reaches said small-diameter portion side; and
said rotary tool is rotated in the direction of advancement of said arc-shaped groove.

3. A friction stir welding method according to claim 1, wherein
a gap is formed between said members at said abutted portion.

4. A friction stir welding method comprising using a rotary tool having a groove formed to the end surface of a large-diameter portion facing a small-diameter portion, said groove extending from the outer periphery of said large-diameter portion and reaching said small-diameter portion side, said rotary tool being rotated while said small-diameter portion and the end surface of said large-diameter portion are inserted in the members to be welded; and
said rotary tool is rotated so that the metal constituting said members is moved toward the axial center of said rotary tool along said groove, wherein
said rotary tool is inserted to the abutted portion between said members,
wherein only one of said members comprises a projection that protrudes toward said large-diameter portion at said abutted portion; and
wherein the other member is abutted against the portion of said first member excluding said projection.

5. A friction stir welding method according to claim 4, wherein a gap is formed between said members at said abutted portion.

6. A friction stir welding method according to claim 4, wherein
said rotary tool is inserted to the lap portion between said members.

7. A friction stir welding method according to claim 4, wherein
the central axis of said rotary tool is substantially orthogonal to the direction of movement of said rotary tool.

8. A friction stir welding method according to claim 4, wherein
when viewing the end surface from the side of said small-diameter portion, said groove is an arc-shaped groove that extends from the outer periphery of said large-diameter portion and reaches said small-diameter portion side; and
said rotary tool is rotated in the direction of advancement of said arc-shaped groove.

9. A friction stir welding method according to claim 8, wherein
the width of said groove at the radial outward side of said rotary tool is greater than the width of said groove at the radial inward side.

10. A friction stir welding method according to claim 8, wherein
a plural number of said grooves are formed to said rotary tool.

11. A friction stir welding method according to claim 10, wherein
the width of the grooves in the direction of rotation is smaller than the width of the space between one groove and the adjacent groove.

12. A friction stir welding method according to claim 4, wherein
said rotary tool comprises two large-diameter portions respectively provided to the two ends of said small-diameter portion, each end surface of said two large-diameter portions that face said small-diameter portion being provided with said groove; and
said rotary tool is rotated while the members to be welded are sandwiched between said two large-diameter portions.

13. A friction stir welding method according to claim 4, wherein
said large-diameter portion having said groove is formed as a separate member from said small-diameter portion.

14. A friction stir welding method according to claim 4, wherein
said large-diameter portion comprises a first large-diameter portion having said groove, and a second large-diameter portion that is formed as the same member as said small-diameter portion;
said small-diameter portion, said first large-diameter portion, and said second large-diameter portion being arranged in said order along the central axis of the rotary tool;
said first large-diameter portion being screwed onto the axis portion between said second large-diameter portion and said small-diameter portion;
the end surface of said first large-diameter portion being in contact with the end surface of said second large-diameter portion; and
said rotary tool being rotated in the same direction as the direction of the screw thread used for screwing said first large-diameter portion.

15. A friction stir welding method according to claim 4, wherein
the depth from the end surface of said large-diameter portion to the bottom of said groove is greater toward the rear side of the direction of rotation than in the front direction thereof; and
said rear side is positioned substantially along the axial direction of said rotary tool.

16. A friction stir welding method using a rotary tool comprising a large-diameter portion and a small-diameter portion, wherein friction stir welding is performed by rotating said rotary tool while said small-diameter portion and an end surface of said large-diameter portion is inserted to members to be welded: wherein
said large-diameter portion comprises a first large-diameter portion that is formed as a separate member from said small-diameter portion, and a second large-diameter portion that is formed as the same member as said small-diameter portion;
said small-diameter portion, said first large-diameter portion, and said second large-diameter portion being arranged in said order along the central axis of the rotary tool;
said first large-diameter portion being screwed onto the axis portion between said second large-diameter portion and said small-diameter portion;
the end surface of said first large-diameter portion being in contact with the end surface of said second large-said rotary tool being rotated in the same direction as the direction of the screw thread used for screwing said first large-diameter portion.

17. A rotary tool for friction stir welding, comprising:

a small-diameter portion;

a large-diameter portion positioned adjacent to the small-diameter portion; and a groove formed to the end surface of said large-diameter portion facing said small-diameter portion, the groove extending from the outer periphery of said large-diameter portion and reaching said small-diameter portion side;

said groove having an arc shape that is curved toward the radial outward direction when viewing said end surface from the small-diameter portion side;

the width of said groove at the radial outward side of said rotary tool is greater than the width of said groove at the radial inward side, a screw thread being formed to said small-diameter portion;

a notch formed to the outer periphery of said large-diameter portion in the front of said groove in the direction of said screw; and a plural number of said grooves formed thereto.

18. A rotary tool for friction stir welding according to claim 17, wherein:

said large-diameter portion having said groove is formed as a separate member from said small-diameter portion.

19. A rotary tool for friction stir welding according to claim 17, wherein:

said rotary tool comprises two large-diameter portions respectively provided to two ends of said small-diameter portion side, and each end surface of said large-diameter portions facing said small-diameter portion is provided with said groove.

20. A rotary tool for friction stir welding comprising:

a small-diameter portion;

a first large-diameter portion formed as the same member as said small-diameter portion, positioned at one end of said small-diameter portion; and a second large-diameter portion formed as a separate member from said small-diameter portion; wherein said small diameter portion, said second large-diameter portion, and said first large-diameter portion being arranged in said order along the central axis of said rotary tool;

said second large-diameter portion being screwed onto a screw thread formed to the axial portion between said first large-diameter portion and said small-diameter portion;

the end surface of said second large-diameter portion being in contact with the end surface of said first large-diameter portion, said small-diameter portion is provided with a screw thread; and the direction of the screw thread on said small-diameter portion is opposite from the direction of the screw thread used for screwing said second large-diameter portion.

21. A friction stir welding method according to claim 14, wherein the small-diameter portion has a screw thread, and the direction of the screw thread on said small-diameter portion is opposite from the direction of the screw thread used for screwing said second large-diameter portion.

22. A friction stir welding method according to claim 1, wherein said end surface of said large-diameter portion is concave.

23. A friction stir welding method according to claim 12, wherein the small-diameter portion has a screw thread, and the screw thread used for screwing said first large-diameter portion has a diameter greater than that of the screw thread of the small-diameter portion.

24. A rotary tool for friction stir welding according to claim 17, wherein said end surface of said large-diameter portion is concave.

25. A rotary tool for friction stir welding according to claim 20, wherein the screw thread used for screwing said second large-diameter portion has a diameter greater than that of the screw thread of the small-diameter portion.

* * * * *